US006984442B2

(12) United States Patent
Brebion et al.

(10) Patent No.: US 6,984,442 B2
(45) Date of Patent: Jan. 10, 2006

(54) MULTILAYER FILM COMPRISING AN AMORPHOUS POLYMER

(75) Inventors: Herve M. Brebion, Simpsonville, SC (US); Frank M. Hofmeister, Mauldin, SC (US); Ram K. Ramesh, Cedar Rapids, IA (US); Paul J. Satterwhite, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 264 days.

(21) Appl. No.: 10/199,567

(22) Filed: Jul. 19, 2002

(65) Prior Publication Data

US 2004/0013862 A1  Jan. 22, 2004

(51) Int. Cl.
*B32B 1/08* (2006.01)
*B32B 3/00* (2006.01)
*B32B 7/02* (2006.01)
*B32B 27/06* (2006.01)
*B29D 22/00* (2006.01)

(52) U.S. Cl. .................. 428/212; 428/474.4; 428/34.3; 428/34.8; 428/35.2; 428/35.7; 428/36.91; 428/200; 428/34.1; 428/474.7; 428/474.9

(58) Field of Classification Search ............ 428/474.9, 428/474.7, 200, 36.91, 35.7, 35.2, 34.8, 34.3, 428/34.1, 474.4, 212
See application file for complete search history.

(56) References Cited

U.S. PATENT DOCUMENTS

| | | | |
|---|---|---|---|
| 4,410,661 A | 10/1983 | Epstein et al. | 525/55 |
| 4,800,129 A | 1/1989 | Deak | 428/474.4 |
| 4,908,272 A | 3/1990 | Harada et al. | 428/412 |
| 4,911,963 A | 3/1990 | Lustig | 428/36.91 |
| 4,952,628 A | 8/1990 | Blatz | 525/58 |
| 5,077,109 A * | 12/1991 | Lustig et al. | 428/36.91 |
| 5,110,855 A | 5/1992 | Blatz | 524/441 |
| 5,208,082 A | 5/1993 | Chou | 428/36.6 |
| 5,480,945 A * | 1/1996 | Vicik | 525/432 |
| 5,491,009 A | 2/1996 | Bekele | 428/35.7 |
| 5,707,750 A | 1/1998 | Degrassi et al. | 428/475.8 |
| 5,837,358 A | 11/1998 | Bauer et al. | 428/213 |
| 6,379,812 B1 * | 4/2002 | Hofmeister et al. | 428/474.4 |
| 6,500,559 B2 | 12/2002 | Hofmeister et al. | |

FOREIGN PATENT DOCUMENTS

| | | |
|---|---|---|
| EP | 0 800 915 A2 | 10/1997 |
| NZ | 222632 | 11/1987 |
| WO | WO 99/56951 | 11/1999 |

* cited by examiner

*Primary Examiner*—Rena Dye
*Assistant Examiner*—Lawrence Ferguson
(74) *Attorney, Agent, or Firm*—Thomas C. Lagaly (57) ABSTRACT

A multilayer film includes a first layer comprising an amorphous polymer that exhibits a glass transition temperature, and a second layer forming an exterior layer of the multilayer film and comprising a sealant material capable of forming a heat-seal, the sealant material comprising a polymer that exhibits a melting point. The glass transition temperature of the amorphous polymer is greater than the melting point of the sealant material by at least about 45 degrees centigrade.

23 Claims, 1 Drawing Sheet

FIG. 1

MULTILAYER FILM COMPRISING AN AMORPHOUS POLYMER

BACKGROUND OF THE INVENTION

The present invention relates to packaging materials of a type employing flexible, polymeric films. More specifically, the invention pertains to multilayer packaging films used in applications requiring a high degree of dimensional stability, i.e., both low shrinkage and low stretch, at elevated temperatures, and also a relatively low oxygen transmission rate.

Packaging applications requiring dimensionally stable films at high temperatures, e.g., up to about 150° C. and sometimes as high as about 180° C., include vertical form-fill-seal (VFFS) packaging for "hot fill" products, such as soups, sauces, jellies, beverages, and other liquified foods. As is well known, in VFFS packaging, a flowable product is introduced through a central, vertical fill tube and into a formed tubular film that has been heat-sealed transversely at its lower end and also longitudinally. Heat-sealing temperatures typically range from about 90 to about 150° C., and often reach or exceed 180° C. as packaging equipment operators attempt to make strong heat-seals, e.g., those that will seal through hot-fill product that inadvertently contaminates the seal area of the film.

After being filled, the package, in the form of a pouch, is completed by transversely heat-sealing the upper end of the tubular segment and simultaneously severing the pouch from the tubular film above it, usually by applying sufficient heat to melt through the tube above the newly formed upper heat-seal. If the film from which the package is made does not have sufficient dimensional stability, the package becomes distorted both from the heated product and from heat-sealing. Not only does package distortion ruin the aesthetic qualities of the package, e.g., by distorting any printed information or other labeling on the package, but it can cause the package to become misaligned in the packaging machinery, often resulting in ruined packages and costly downtime in production as misaligned packages become wedged between pieces of the machinery or when heat-sealing/severing equipment inadvertently contacts and melts through the walls of the package instead of sealing and severing at the periphery of the misaligned package as intended.

Similar considerations apply in VFFS and horizontal form/fill/seal (HFFS) packaging of flowable particulate products, e.g., shredded cheese, frozen chicken wings and nuggets, etc. Although such products are generally not filled while in a heated state, transverse and longitudinal heat-sealing and heat-severing alone are sufficient to cause package distortion, thereby making a film which is dimensionally stable at elevated temperatures highly desirable for such packaging applications.

Another packaging application for which high-temperature dimensional film stability would be desirable is when films are used as lidding materials for flexible packages, such as thermoformed pockets in which, e.g., hot dogs, lunch meats, etc., are contained; semi-rigid vacuum and/or gas-flushed packages for meat and poultry contained in a foam or other semi-rigid type tray; and rigid packages, e.g., for yogurt, custard and other dairy products contained in a rigid cup-like container. When lidding films are applied to such packages, heat is generally used to seal the film to the thermoformed container, tray, or cup in which the product is contained. As with the foregoing form-fill-seal packaging operations, high heat-seal temperatures are often employed in order to form strong heat-seals that will seal through particles or globs of food that contaminate the heat-seal area. Without sufficient dimensional stability, the lidding films can either stretch or shrink during the lidding process, resulting in incompletely sealed packages and distorted printed images on the films.

A further process necessitating dimensional stability at elevated temperatures is printing. Maintenance of color-to-color registration on the printing press is important, as is overall consistency of the "repeat length" of each printed image. Drying tunnel temperatures commonly reach temperatures of 120° F. or more. It is therefore preferred that the film have sufficient resistance to stretching, necking and other types of deformation at these temperatures so that registration is not lost, and that the repeat length of the images are consistently maintained on downstream packaging equipment, where it may again face elevated temperatures as noted above. When a film is printed, any deformation that occurs during the packaging process is particularly troublesome, in that the printed image becomes visibly distorted. Thus, maintaining dimensional stability under high-temperature packaging is especially important when the film is printed.

Another requirement of films used in many of the aforementioned packaging applications is a low transmission rate of oxygen in order to preserve and extend the shelf life of packaged food products. For many food products, the oxygen transmission rate (OTR) must be on the order of 40 $cc/m^2$ per 24 hours at 1 atmosphere or less.

In order to achieve the above properties, many conventional packaging films used for such applications have been laminates, i.e., two or more film components that are adhesively bonded together, e.g., biaxially-oriented and heat-set polypropylene, polyester, or polyamide films that are adhesively laminated to a heat-sealable film where one of the laminated film components contains a low OTR material such as polyvinylidene chloride. However, adhesive lamination is expensive, due to the relatively high cost of the adhesives and the extra production steps required to produce the laminate, and the reliability of such adhesives is sometimes suspect, e.g., solvents from printing inks can reduce the bond-strength of the adhesives, leading to delamination. Further, certain types of adhesives contain low-molecular weight components that can migrate through films and contact the packaged food products.

Instead of using a laminate, it would be preferred to use a film that is fully coextruded, i.e., formed by extruding two or more polymeric materials through a single die with two or more orifices arranged so that the extrudates merge and weld together into a multilayer structure.

A proposed coextruded film having high-temperature dimensional stability and a low OTR includes a core layer of ethylene/vinyl alcohol copolymer (EVOH), a layer of amorphous polyamide to provide relatively high modulus at high temperatures, and a heat-sealing layer. While this film was able to address some of the problems detailed above, it was found that it did not provide a sufficiently wide temperature-processing window to make high quality packages from such film. That is, the glass transition temperature of the amorphous polyamide and the melting point of the heat-sealing layer were found to be too close to one another to provide a desired combination of good heat-sealability and dimensional stability at elevated temperatures.

Accordingly, there continues to be a need in the art for a coextruded, low-OTR multilayer film having a combination of high-temperature dimensional stability and low-temperature heat-sealability.

SUMMARY OF THE INVENTION

That need is met by the present invention which provides a multilayer film, comprising, a. a first layer comprising an amorphous polymer that exhibits a glass transition temperature; and b. a second layer forming an exterior layer of the multilayer film and comprising a sealant material capable of forming a heat-seal, the sealant material comprising a polymer that exhibits a melting point.

The glass transition temperature of the amorphous polymer is greater than the melting point of the sealant material by at least about 45 degrees centigrade.

DETAILED DESCRIPTION OF THE INVENTION

Figure 1:
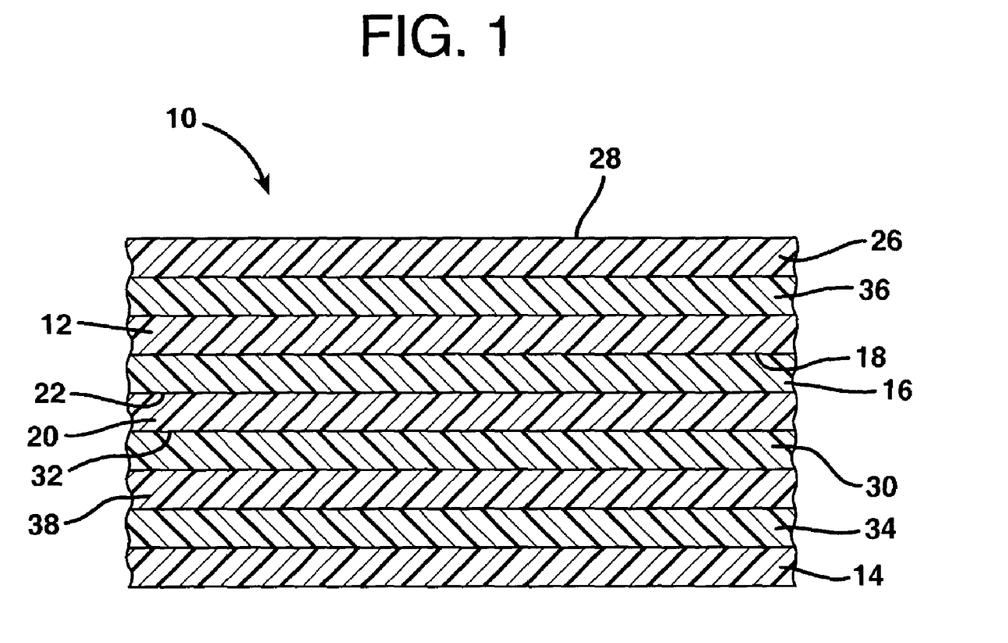
FIG. 1 is a cross-sectional view of a multilayer film in accordance with the invention.

FIG. 1 depicts one embodiment of a multilayer film in accordance with the present invention. In the instant depiction, multilayer film 10 includes nine layers. As is readily understood by those of ordinary skill in the art of film manufacture, a greater or lesser number of layers may be included, depending on the specific attributes that are desired in such a film to suit the intended end-use application. As used herein, the term "multilayer film" refers to a thermoplastic material, generally in sheet or web form, having one or more layers formed from polymeric or other materials which are bonded together by any conventional or suitable method, including one or more of the following methods: coextrusion, extrusion coating, lamination, vapor deposition coating, solvent coating, emulsion coating, or suspension coating, but preferably by coextrusion.

Multilayer film 10 includes a first layer 12, comprising an amorphous polymer that exhibits a glass transition temperature, and a second layer 14, which forms an exterior layer of multilayer film 10 as shown and which comprises a sealant material capable of forming a heat-seal. First layer 12 may be an interior or exterior layer, but is preferably an interior layer, and preferably includes at least one layer positioned between the first layer and the exterior layers of the film that serves as a moisture vapor barrier, such as, e.g., a layer comprising polyolefin.

As used herein, the term "amorphous polymer" refers to those polymers that are substantially lacking in crystallinity as shown by the lack of an endotherm crystalline melting peak in a Differential Scanning Calorimeter (DSC) test in accordance with ASTM D-3417. Amorphous polymers generally lack a regular three-dimensional arrangement of molecules or molecule sub-units that extend over distances which are large relative to atomic dimensions. However, regularity of structure may exist on a local scale as minor, semi-crystalline phases. See, "Amorphous Polymers," Encyclopedia of Polymer Science and Engineering, 2nd Ed., pp. 789–842 (J. Wiley & Sons, Inc. 1985).

As used herein, the term "glass transition temperature," sometimes abbreviated herein as "$T_g$", refers to the approximate midpoint of the temperature range over which an amorphous polymer undergoes a reversible change from a hard, glassy, or brittle condition to a flexible or elastomeric condition, and may be determined in accordance with ISO 3146-C or ASTM D-3418.

The amorphous polymer in first layer 12 preferably has a glass transition temperature of at least about 140° C., such as at least about 145, 150, 155, 160, 165, 170, 175, or 180° C. First layer 12 preferably comprises less than about 50% of the total thickness of film 10, such as less than about 45, 40, 35, 30, or 25% of the total thickness of film 10. If desired, other layers in addition to layer 12 may have such amorphous polymer therein, either as a major or minor component. Generally, the amorphous polymer is preferably a minor component of the total constituency of film 10. Thus, film 10 preferably contains at least about 40 wt. %, such as at least about 45, 50, 55, 60, 65, 70 or 75 wt. %, of materials having a $T_g$ of less than 125° C.

An example of an amorphous polymer that may be used in first layer 12 is an amorphous polyamide. Generally, amorphous polyamides can be characterized as high molecular-weight polymers in which amide linkages occur, and which contain aromatic segments with various proportions of aliphatic segments. For example, some amorphous polyamides are copolyamides of an aliphatic diamine and an aromatic isophthalic and/or terephthalic diacid.

Suitable amorphous polyamides may include those amorphous polymers that are prepared from the following diamines: hexamethylenediamine, 2-methylpentamethylenediamine (MPMD), 2,2,4-trimethylhexamethylenediamine (TMD), 2,4,4-trimethylhexamethylenediamine (IND), bis(4-aminocyclohexyl)methane, 2,2-bis(4-aminocyclohexyl)isopropylidine, 1,4-diaminocyclohexane, 1,3-diaminocyclohexane, meta-xylylenediamine (MXD), 1,5-diaminopentane, 1,4-diaminobutane, 1,3-diaminopropane, 2-ethyldiaminobutane, 1,4-diaminomethylcyclohexane, 3,3'-dimethyl-4,4'-diamino-dicyclohexylmethane (MACM), 3-aminomethyl-3,5,5-trimethylcyclohexylamine (IPD), bis(4-aminocyclohexyl)methane (PACM), 2,2-bis(p-aminocyclohexyl) propane (PACP), 1,6-diamino-2,2,4-trimethylhexane (ND), p-xylylenediamine (PXD), m-phenylenediamine, p-phenylenediamine, and alkyl substituted m-phenylenediamine and p-phenylenediamine.

Examples of amorphous polyamides that can be used also include those amorphous polymers prepared from the following dicarboxylic acids: isophthalic acid (I), terephthalic acid (T), 1,3-phenylenedoxydiacetic acid, 1,4-cyclohexanedicarboxylic acid, 2,6-napthalene dicarboxylic acid (N), 1,1,3-trimethyl-3-phenylindan-4,5 dicarboxylic acid, alkyl substituted iso- and terephthalic acid, adipic acid, sebacic acid, octadecanedioic, dodecanedioic acid (DDA), brassylic acid, tetradecanedioic acid, butane dicarboxylic acid, and the like.

The diamines and dicarboxylic acids mentioned above can be combined as desired. For example, an aliphatic diamine can generally be combined with an aromatic dicarboxylic acid as noted above, or an aromatic diamine can be combined with an aliphatic dicarboxylic acid. Amorphous polyamides prepared from aromatic diamines and aromatic diacids, or those prepared from aliphatic diamines and aliphatic diacids, may also be suitable. Preferred amorphous polyamides are those in which either the diamine or the dicarboxylic acid moiety is aromatic, and the other moiety is aliphatic. The aliphatic groups of these polyamides preferably contain between 4 and 12 carbon atoms in a chain or an aliphatic cyclic ring system having up to 15 carbon atoms. The aromatic groups of the polyamides preferably have mono or bicyclic aromatic rings which may contain aliphatic substituents of up to about 6 carbon atoms. If desired, more than one diamine may be combined with one diacid, more than one diacid may be combined with one diamine, and more than one diacid and more than one diamine may be combined. The amorphous polyamides may also contain as comonomers amounts of lactam species such as caprolactam or lauryl lactam, 3,6-bis(aminomethyl)norbornane (AMNB) and diphenylmethane-4-4'diisocyanate (MDI).

It is not necessary that the above-recited polyamide forming monomers be used per se in the polymerization reaction. The actual materials used in the polymerization reaction may be the recited monomers or polyamide-forming derivatives of these monomers, such as the acid chloride, ammonium salt, ester, half-ester, and the like.

Specific examples of suitable amorphous polyamides include: polyamide 6I/6T, polyamide 6I/MACMT, polyamide 6I/MACMI, polyamide 6I/MACMI/MACMT, polyamide 6/MACMI/MXDI, polyamide 6I/6T/MACMI, polyamide 6I/6T/MACMI/MACMT, polyamide 12/MACMT, polyamide 12/MACMI, polyamide 12/IPDI/PACMI, polyamide 12/PACMI, polyamide TMDT, polyamide 6I/6T/IPD, polyamide 6I/6T/PACMI/PACMT, polyamide 6I/6, polyamide MACMI/MACMX, polyamide XT/MACMT, polyamide PACM12, polyamide 6/AMNBT and polyamide MDI6/MDI9. Such amorphous polyamides are commercially available from a number of manufactures, such as from EMS-Chemie under the designation Grilamid and Grivory; from Degussa under the designation Trogamid; from ELF Atochem under the designation Cristamid; from Mitsubishi Kasei under the designation Novamid; from Bayer AG under the designation Durethan; and from DuPont under the designation Selar or Zytel.

Further information regarding the foregoing amorphous polyamides may be found in the "Nylon Plastics Handbook" by M. I. Kohan, particularly at pgs. 3–8 and 377–387, the disclosure of which is hereby incorporated by reference herein.

If desired, first layer 12 may comprise a blend of at least two amorphous polyamides. When amorphous polyamides are to be employed as the amorphous polymer in first layer 12, it is preferred that layer 12 consists essentially of amorphous polyamide, whether one or more amorphous polyamides are used in such layer. Optionally, however, the amorphous polyamide may be blended with a crystalline material, e.g., crystalline polyamide.

Alternative materials that may be used as the amorphous polymer in first layer 12 are polymers that are referred to as "high-performance polymers," which have been developed for structural applications or for use in mechanical and electrical components with long-term heat-resistance requirements at temperatures greater than 150° C. Such polymers include polycarbonate (PC), cyclic olefin copolymers (e.g., ethylene/norbornene copolymer), polysulfone (PSU), polyethersulfone (PES), polyarylsulfone (PAS), styrene maleic anhydride copolymer (SMA), polyetherimide (PEI), polyphenylene oxide (PPO), PPO/polystyrene (PS) alloys, polyphenylene ether (PPE), and polyarylate. Suitable polycarbonates are available from Dow Chemicals under the designation Calibre® and from Bayer Corporation under the designation APEC®. Suitable PPO/PS alloys and polyphenylene oxides are available from General Electric Corporation under the designation Noryl® and PPO®, respectively. Suitable polyphenylene ethers are available from Degussa under the designation Vestoran®. Suitable PEI is available from General Electric Corporation under the designation Ultem®. Suitable styrene maleic anhydride copolymers are available from Nova Chemicals under the designation Dylark®. Suitable cyclic olefin copolymers are available from Zeon under the designation Zeonor® and from Ticona under the designation Topas®. Suitable polysulfones are available from Solvay under the designation Udel® or from BASF under the designation Ultrason®. Suitable polyethersulfones are available from Amoco Polymers under the designation Radel®. Suitable polyarylates are from Amoco Polymers under the designation Ardel®.

Multilayer film 10 preferably has a storage modulus of at least 100 pounds/linear inch of width at temperatures up to 140° C. For a film having a thickness of 2.5 mils (0.0025 inch), a storage modulus of at least 100 pounds/linear inch equates to a storage modulus of at least 40,000 pounds/in$^2$ (storage modulus is based on the cross-sectional area of the film, and may be determined in accordance with ASTM D-5026-95a). Such a storage modulus provides the films of the present invention with excellent high-temperature dimensional stability, and may be achieved by including an amorphous polymer in first layer 12, e.g., having a $T_g$ of at least about 140° C. More preferably, film 10 maintains a storage modulus of at least 100 pounds/linear inch at temperatures up to 145° C. and beyond, such as 150, 155, 160, or 165° C. Regardless of the thickness of film 10, it preferably maintains a storage modulus of at least about 20,000 psi, such as at least about 30,000, 35,000, 40,000, or 45,000 psi, at temperatures up to 130° C., such as up to 135, 140, 145, 150, 155, 160, or 165° C. Preferably, however, the film is not overly stiff or brittle at room temperatures. Thus, the film preferably has a storage modulus of less than about 750,000 psi, such as less than 600,000, 500,000, 400,000, 300,000, 200,000, or 150,000 psi at temperatures of about 73° F.

As noted above, second layer 14 forms an exterior layer of multilayer film 10 and comprises a sealant material capable of forming a heat-seal. The sealant material is preferably a type of polymer that exhibits a melting point.

As used herein, the phrase "exterior layer" refers to any layer of a multilayer film having only one of its principal surfaces directly adhered to another layer of that film. In a multilayer film, there are two exterior layers, each of which has a principal surface adhered to only one other layer of the film. The other principal surface of each of the two exterior layers forms the two principal outer surfaces of the film. The layers disposed between the two exterior layers are "interior layers," i.e., those that have both of their principal surfaces directly adhered to another layer of the film.

As used herein, the term "heat-seal" refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool.

As used herein, the term "melting point," sometimes abbreviated herein as "$T_m$", refers to an endotherm crystalline melting peak as determined by Differential Scanning Calorimetry (DSC) in accordance with ASTM D-3417.

The sealant material in second layer 14 preferably has a melting point of less than about 130° C., such as less than about 120, 110, 100, 90, 80, or 70° C. The sealant material preferably comprises at least about 20 wt. % of second layer 14, based on the total weight of layer 14, such as at least about 40, 60, 80, 90, or 95 wt. %. Examples of suitable polymers for the sealant material include ionomers (e.g., SURLYN from DuPont), heterogeneous (Ziegler-Natta catalyzed) ethylene/alpha-olefin copolymer such as linear low density polyethylene, homogeneous (single-site, metallocene-catalyzed) ethylene/alpha-olefin copolymer, ethylene/unsaturated ester copolymer (e.g., ethylene/vinyl acetate copolymer, ethylene/methyl acrylate copolymer, ethylene/butyl acrylate copolymer, etc.), ethylene/unsaturated acid copolymer (e.g., ethylene/acrylic acid copolymer, ethylene/methacrylic acid copolymer, etc.), ethylene/propylene copolymer, and polybutylene homopolymer or copolymer.

In accordance with the present invention, the glass transition temperature of the amorphous polymer in first layer 12 is greater than the melting point of the sealant material in second layer 14 by at least about 45 degrees centigrade, i.e., the $T_g$ of the amorphous polymer minus the $T_m$ of the sealant material ("$\Delta T$") is greater than or equal to about 45° C. The inventors found that when the $\Delta T$ between the $T_g$ of the amorphous polymer and the $T_m$ of the sealant material is greater than or equal to about 45° C., the film possesses a sufficiently wide temperature-processing window to make high-quality packages from such film on a large-scale, commercial basis in a wide variety of packaging processes.

That is, with a $\Delta T$ of 45° C. or more, it is now more readily possible to employ processing temperatures that are above the $T_m$ of the sealant material in order to form strong heat-seals and, at the same time, remain below the $T_g$ of the amorphous polymer in order to maintain the dimensional stability of the film and package throughout the packaging process. In this manner, the same film can be used in various types of packaging operations (some of which have been discussed hereinabove), which invariably employ different heat-seal temperatures and otherwise subject the film to different levels of temperature and mechanical stress. The wide processing window provided by a $\Delta T$ of 45° C. or more in accordance with the present invention allows the film to be used in these different packaging processes without the costly necessity of tailoring a number of different films to suit each process. A more preferred $\Delta T$ is at least 55° C., such as 65, 75, 85 or 90° C.

Multilayer film 10 preferably further includes a third, interior layer 16 adhered to surface 18 of first layer 12. Third layer 16 preferably comprises at least one member selected from polyamide homopolymer or copolymer (e.g., one having greater than 50 mole percent polyamide 6 or polyamide 66), acid-modified polyolefins, anhydride-modified polyolefins, ethylene/acrylic acid copolymer, and ethylene/methacrylic acid copolymer.

A fourth, interior layer 20 is preferably also included, and may be adhered to surface 22 of third layer 16. The composition of fourth layer 20 may be selected such that layer 20 functions as an oxygen barrier layer, and preferably has an oxygen transmission rate (OTR) of less than or equal to 30 cc of oxygen per square meter of film per 24 hour period at 1 atmosphere and at a temperature of 73° F. (at 0% relative humidity). In this manner, the entire film 10 will have such OTR. More preferably, layer 20, and therefore film 10, has an OTR of less than 25 cc/m² per 24 hours at 1 atm., and more preferably less than 20, more preferably still less than 15, even more preferably less than 10, such as less than 8, less than 7, or less than 6 cc/m² per 24 hours at 1 atm. (73° F. and 0% RH). Examples of suitable materials for fourth layer 20 include ethylene/vinyl alcohol copolymer (EVOH), polyamide MXD6, polyamide MXD6/MXDI, polyvinylidene chloride (PVDC), and polyacrylonitrile (PAN), including copolymers of PVDC and PAN. EVOH is preferred.

When the fourth layer 20 comprises ethylene/vinyl alcohol copolymer, polyamide MXD6, or polyamide MXD6/MXDI, the third layer 16 preferably comprises at least one member selected from polyamide homopolymer or copolymer having greater than 50 mole percent polyamide 6, polyamide homopolymer or copolymer having greater than 50 mole percent polyamide 66, acid-modified polyolefins, and anhydride-modified polyolefins. Preferred polyamides in accordance with the foregoing include polyamide 6, polyamide 66, polyamide 6/66, polyamide 6/69, polyamide 6/12, polyamide 66/610, and polyamide 66/69. Preferred examples of acid-modified polyolefins include ethylene/acrylic acid copolymer and ethylene/methacrylic acid copolymer. Preferred anhydride-modified polyolefins include anhydride-grafted ethylene/1-butene copolymer, anhydride-grafted ethylene/1-hexene copolymer, anhydride-grafted ethylene/1-octene copolymer, anhydride-grafted ethylene/vinyl acetate copolymer, and anhydride-grafted polypropylene.

As used herein, the term "anhydride-modified" refers to any form of anhydride functionality, such as the anhydride of maleic acid, fumaric acid, etc., whether grafted onto a polymer, copolymerized with a polymer, or blended with one or more polymers, and is also inclusive of derivatives of such functionalities, such as acids, esters, and metal salts derived therefrom.

When fourth layer 20 comprises polyvinylidene chloride or polyacrylonitrile, third layer 16 preferably comprises an ethylene copolymer or terpolymer having between 5 and 30 mole % ester mer units. Such ester mer units may include, for example, methacrylate, n-butyl acrylate, iso-butyl acrylate, ethyl acrylate, vinyl acetate (e.g., ethylene/methacrylate copolymer, etc.). An example of a suitable terpolymer may comprise 80% ethylene, 10% iso-butyl acrylate, and 10% methacrylic acid.

Multilayer film 10 may further comprise a fifth layer 26 to form a second exterior layer of the multilayer film in opposing relation to second layer 14. This fifth, exterior layer 26 preferably comprises a material having a surface energy of at least 36 dynes/cm². Such a surface energy allows an image to be printed on outer surface 28 of fifth layer 26. Suitable materials for fifth layer 26 include at least one material selected from polyamides, polyesters, polycarbonates, polyurethanes, and polyacrylates. Polyolefin surfaces having been modified by corona, plasma, flame treatment or acid etching such that the surface energy exceeds 36 dynes/cm² are also suitable for printing. Fifth layer 26 also preferably provides heat- and abuse-resistance to the film. If a crystalline material is used, such material preferably has a melting point of at least about 100° C., such as at least about 110, 120, 130° C., etc. If an amorphous material is used, such material preferably has a $T_g$ of at least about 100° C., such as at least about 110, 120, 130° C., etc. A crystalline polyamide such as polyamide 6 is preferred.

Multilayer film 10 may further comprise a sixth, interior layer 30 adhered to surface 32 of fourth layer 20. The sixth layer 30 may be formed from the same material(s) as third layer 16, and thus may comprise at least one member selected from polyamide homopolymer or copolymer having greater than 50 mole percent polyamide 6, polyamide homopolymer or copolymer having greater than 50 mole percent polyamide 66, acid-modified polyolefins, anhydride-modified polyolefins, ethylene/acrylic acid copolymer, ethylene/methacrylic acid copolymer, and ethylene copolymer or terpolymer having between 5 and 30 mole % ester mer units. Preferred materials include at least one member selected from polyamide 6, polyamide 66, and polyamide 6/66.

Multilayer film 10 may further comprise a seventh, interior layer 34 positioned generally between the second and sixth layers 14, 30, e.g., adjacent second layer 14 as shown.

It is preferred to include seventh layer 34 to balance any tendency of film 10 to curl. For example, the film may have a tendency to curl if fifth layer 26 contracts to a greater or lesser degree than the other layers of the film upon cooling. This may occur, for instance, when fifth layer 26 is a crystalline or semi-crystalline material, such as a semi-crystalline polyamide. In such case, it may contract to a greater degree upon cooling than the other film layers and, being an exterior layer, exerts a curling force on the film such that the film tends to curl towards the fifth layer. This tendency can be offset by including in seventh layer 34 a material that balances the curl of the film such as, e.g., high density polyethylene, low density polyethylene, linear low density polyethylene, polypropylene, polyamide, cyclic olefin copolymer, or polyester.

Polymeric adhesive layers, commonly referred to as "tie" layers, may be included in multilayer film 10 wherever necessary or desired. Thus, a first polymeric adhesive layer 36 may be included between first layer 12 and fifth layer 26 and a second polymeric adhesive layer 38 may be included between sixth layer 30 and seventh layer 34. Layers 36 and 38 may comprise any suitable polymeric adhesive, such as an olefin polymer or copolymer having an anhydride functionality grafted thereon and/or copolymerized therewith and/or blended therewith. Examples of suitable polymeric adhesives include the following anhydride-grafted polymers: ethylene/1-butene copolymer, ethylene/1-hexene copolymer, ethylene/1-octene copolymer, ethylene/vinyl acetate copolymer, polypropylene, polyhydroxyether of bisphenol-A, styrene butadiene block copolymer, and low density polyethylene.

Multilayer film 10 may be made by any suitable film-making process, e.g., cast or blown through either an annular or flat die, and is preferably fully coextruded. As used herein, the term "coextruded" refers to the process of extruding two or more materials through a single die with two or more orifices arranged so that the extrudates merge and weld together into a laminar structure before chilling and solidifying, e.g., via water, chilled metal roll, or air quenching. Multilayer film 10 preferably has less than 5% shrink in at least one direction at 150° C. Thus, it is preferred that the film is not oriented after coextrusion or, if it is, that it be heat-set to remove substantially all of the shrink capability from the film.

Multilayer film 10 may have any desired thickness, e.g., ranging from about 0.5 to about 50 mils. More preferably, the thickness ranges from 0.5–40 mils, such as between 0.5–30 mils, 0.5–20 mils, or 1–15 mils, including sub-ranges such as 1–10 mils, 1–5 mils, or 1.5–4 mils. Each layer of the film, including those described hereinabove as well as other layer that may be included in film 10, may have any desired thickness ranging, e.g., from 5 to 70% of the total thickness of film 10, including all sub-ranges therebetween, e.g., greater than 5, 10, 15, 20, 30 or 40%, or less than 70, 60, 50, or 40%.

Each of the layers of multilayer film 10 are preferably adhered to one another at a bond strength of at least 0.5 $lb_f$/inch (ASTM F 904) and, more preferably, at a bond strength of at least 0.7 $lb_f$/inch.

Multilayer film 10 preferably has at least about 40 wt. % polyolefin, based on the total weight of the film, such as at least about 45, 50, 55, 60, 65, 70, or 75 wt. % polyolefin.

If desired or necessary, any desired lubricating agents or other processing aids may be included in any of the layers. Such processing aids may include, e.g., graphite, molybdenum disulphide, PEFT, polyethylene and other hydrocarbons, calcium stearate, metallic stearates, fatty acid amides and esters, polyolefin waxes, polyamides, fluoropolymers, silicones, boron nitride, etc.

Film 10 may be pigmented or clear. If clear, the film preferably has a haze of less than about 20%, such as less than about 15 or 10% (ASTM D-1003).

Multilayer film 10 may advantageously be used to make any desired package, particularly those employing heat-seals as described above in the Background section hereof.

The invention will now be further described in the following examples.

EXAMPLES

The materials used in the examples are identified below:
1. PA6-1: CAPRON B100WP; a polyamide 6 resin having a melt flow index of 2.6 g/10 min (ASTM D-1238 (235/1.0)), a density of 1.135 g/cc (ASTM D-792) and a melting point of 220° C.; purchased from Honeywell of Hopewell, Va.
2. aPA-1: GRIVORY G21; an amorphous polyamide 6I/6T resin with a glass transition temperature ($T_g$) of 125° C. (ASTM D-3418) and a density of 1.18 g/cc (ASTM D-792); obtained from EMS of Sumter, S.C.
3. aPA-2: GRILAMID TR55; an amorphous polyamide 12/MACMT resin with a glass transition temperature ($T_g$) of 155° C. (ASTM D-3418) and a density of 1.06 g/cc (ASTM D-792); obtained from EMS of Sumter, S.C.
4. aPA-3: GRIVORY FE5749; an amorphous polyamide 6I/6T/MACMI resin with a glass transition temperature ($T_g$) of 158° C. (ASTM D-3418) and a density of 1.15 g/cc (ISO 1183); obtained from EMS of Sumter, S.C.
5. aPA-4: GRIVORY FE5750; an amorphous polyamide 6I/6T/MACMI/MACMT resin with a glass transition temperature ($T_g$) of 181° C. (ISO 3146-C) and a density of 1.15 g/cc (ISO 1183); obtained from EMS of Sumter, S.C.
6. PA6-2: ULTRAMID KR-4407; a polyamide 6 resin having a density of 1.14 g/cc (ASTM D-3418) and a melting point of 220° C. (ASTM D-3418), containing less than 1% combined talc and silicon oil; purchased from BASF of Mount Olive, N.J.
7. MB1: GRILON XE 3361; a polyamide-6 masterbatch containing 5% talcum (magnesium silicate), 5% calcium carbonate, and 5% n,n'-ethylene bis stearamide with a density of 1.140 g/cc (ASTM D-792) and a melting point of 220° C.; purchased from EMS of Sumter, S.C.
8. MB2: CLARIANT 1080864S; a polyamide-6 masterbatch containing 20% diatomaceous earth and 10% erucamide with a density of 1.20 g/cc (ASTM D-792) and a melting point of 220° C.; purchased from Clariant of Minneapolis, Minn.
9. MB3: FSU 255E: a low density polyethylene based masterbatch containing 25.0% diatomaceous earth silica and 5.0% erucamide with a melt index of 8.0 g/l 0 min (ASTM D-1238) and a density of 1.08 g/cc (ASTM D-792); obtained from A. Schulman of Cleveland, Ohio.
10. MB4: Compol 5B10S1: an ethylene-methacrylic acid based masterbatch containing 5 wt. % antiblock and 10 wt. % slip agent with a melt index of 2.5 g/10 min (ASTM D-1238—condition "E") and a density of 0.96 g/cc (ASTM D-792); obtained from DuPont of Wilmington, Del.
11. EVOH: SOARANOL ET3803; an ethylene/vinyl alcohol copolymer having 38% ethylene, a melt index of 3.2 g/10 min (ASTM D-1238) and a density of 1.17 g/cc (ASTM D-792); obtained from Nippon Goshei, supplied by Soarus of Arlington Heights, Ill.
12. TIE-1: PX 3236; an anhydride-grafted linear low density polyethylene having a melt index of 2.0 g/10 min (ASTM D-1238) and a density of 0.921 g/cc (ASTM D-792); purchased from Equistar Chemicals of Chicago, Ill.
13. TIE-2: PX 2049; an anhydride-grafted high density polyethylene having a melt index of 4.7 g/10 min (ASTM D-1238) and a density of 0.955 g/cc (ASTM D-792); obtained from Equistar Chemicals of Chicago, Ill.
14. HDPE: FORTIFLEX T60-500-119; a high density polyethylene with a melt index of 6.2 g/10 min (ASTM D-1238) and a density of 0.961 (ASTM D-792); obtained from Solvay Polymers of Houston, Tex.
15. LLDPE-1: EXACT 3024: a homogeneous ethylene/butene-1 copolymer, produced by single site metallocene catalysis, with a melt index of 4.5 g/10 min (ASTM D-1238), a melting point ($T_m$) of 98° C. (DSC per ExxonMobil Method) and a density of 0.905 g/cc (Density per ExxonMobil Method); purchased from Exxon Mobil of Houston, Tex.
16. LLDPE-2: AFFINITY KC 8852: a homogeneous ethylene/octene copolymer, produced via INSITE™ Technology, with a melt index 3.0 g/10 min of (ASTM D-1238), a melting point ($T_m$) of 68° C. (DSC per Dow Method) and a density of 0.875 g/cc (ASTM D-792); purchased from Dow Chemicals of Chicago, Ill.
17. LLDPE-3: SURLYN 9020: an ethylene/methacrylic acid copolymer, partially neutralized with zinc ions (commonly referred to as an "ionomer"), with a melt index of 1.0 g/10 min (ASTM D-1238), a melting point ($T_m$) of 81° C. (Differential Thermal Analysis per DuPont method) and a density of 0.96 g/cc (ASTM D-792); purchased from DuPont of Wilmington, Del.
18. LLDPE-4: EXCEED 4518PA; an ethylene hexene-1 copolymer, produced by single site catalysis, with a melt index of 4.5 g/10 min (ASTM D-1238) and a density of 0.918 g/cc (ASTM D-1505); purchased from Exxon Mobil of Houston, Tex.
19. LLDPE-5: TAFMER P-0480; an ethylene propylene copolymer (80% ethylene/20% propylene), with a melt index of 1.8 g/10 min (ASTM D-1238) and a density of 0.87 g/cc (ASTM D-792) purchased from Mitsui Chemicals of Newark, N.J.
20. LDPE: ESCORENE LD200.48; a low density polyethylene with a melt index of 7.5 g/10 min (Melt index per ExxonMobil Method) and a density of 0.917 g/cc (Density per ExxonMobil Method); obtained from Exxon Mobil of Houston, Tex.

Example 1 (Comparative)

With reference to FIG. 1, a comparative multilayer film was made and had the following nine-layer structure with a total film thickness of 2.5 mils:
Layer 14: 96% LLDPE-1+4% MB3 (12% of total thickness of layers 1–9) [Seal Layer];
Layer 34: HDPE (18% of total thickness of layers 1–9);
Layer 38: TIE-1 (10% of total thickness of layers 1–9);
Layer 30: PA6-1 (6.5% of total thickness of layers 1–9);
Layer 20: EVOH (6% of total thickness of layers 1–9);
Layer 16: PA6-1 (6.5% of total thickness of layers 1–9);
Layer 12: aPA-1 (18% of total thickness of layers 1–9);
Layer 36: TIE-1 (10% of total thickness of layers 1–9); and
Layer 26: 96% PA6-2+2% MB1+2% MB2 (13% of total thickness of layers 1–9).

The film was fully coextruded and produced by a cast coextrusion process using an annular die, followed by a water quench upon exiting the die.

Example 2

With reference to FIG. 1, a multilayer film in accordance with the present invention was made by the process described above for Comparative Example 1, and had the following nine-layer structure with a total film thickness 2.5 mils:
Layer 14: 92% LLDPE-3+8% MB4 (12% of total thickness of layers 1–9) [Seal Layer];
Layer 34: 55% LLDPE-4+35% LLDPE-5+10% LDPE (12% of total thickness of layers 1–9);
Layer 38: TIE-2 (16% of total thickness of layers 1–9);
Layer 30: PA6-1 (6.5% of total thickness of layers 1–9);
Layer 20: EVOH (6% of total thickness of layers 1–9);
Layer 16: PA6-1 (6.5% of total thickness of layers 1–9);
Layer 12: aPA-2 (18% of total thickness of layers 1–9);
Layer 36: TIE-1 (10% of total thickness of layers 1–9); and
Layer 26: 96% PA6-2+2% MB1+2% MB2 (13% of total thickness of layers 1–9).

Example 3

Again with reference to FIG. 1, a multilayer film in accordance with the present invention was made as described in Comparative Example 1 and had the following nine-layer structure with a total film thickness 2.5 mils:
Layer 14: 93% LLDPE-2+7% MB3 (15% of total thickness of layers 1–9) [Seal Layer];
Layer 34: HDPE (15% of total thickness of layers 1–9);
Layer 38: TIE-1 (10% of total thickness of layers 1–9);
Layer 30: PA6-1 (6.5% of total thickness of layers 1–9);
Layer 20: EVOH (6% of total thickness of layers 1–9);
Layer 16: PA6-1 (6.5% of total thickness of layers 1–9);
Layer 12: aPA-2 (18% of total thickness of layers 1–9);
Layer 36: TIE-1 (10% of total thickness of layers 1–9); and
Layer 26: 96% PA6-2+2% MB1+2% MB2 (13% of total thickness of layers 1–9).

Example 4

Also with reference to FIG. 1, a multilayer film in accordance with the present invention was made as described in Comparative Example 1 and had the following nine-layer structure with a total film thickness 2.5 mils:
Layer 14: 93% LLDPE-2+7% MB3 (15% of total thickness of layers 1–9) [Seal Layer];
Layer 34: HDPE (15% of total thickness of layers 1–9);
Layer 38: TIE-1 (10% of total thickness of layers 1–9);
Layer 30: PA6-1 (6.5% of total thickness of layers 1–9);
Layer 20: EVOH (6% of total thickness of layers 1–9);
Layer 16: PA6-1 (6.5% of total thickness of layers 1–9);
Layer 12: aPA-3 (18% of total thickness of layers 1–9);
Layer 36: TIE-1 (10% of total thickness of layers 1–9); and
Layer 26: 96% PA6-2+2% MB1+2% MB2 (13% of total thickness of layers 1–9).

Example 5

With further reference to FIG. 1, a multilayer film in accordance with the present invention was made as described in Comparative Example 1 and had the following nine-layer structure with a total film thickness 2.5 mils:

Layer 14: 93% LLDPE-2+7% MB3 (15% of total thickness of layers 1–9) [Seal Layer];
Layer 34: HDPE (18% of total thickness of layers 1–9);
Layer 38: TIE-1 (10% of total thickness of layers 1–9);
Layer 30: PA6-1 (6.5% of total thickness of layers 1–9);
Layer 20: EVOH (6% of total thickness of layers 1–9);
Layer 16: PA6-1 (6.5% of total thickness of layers 1–9);
Layer 12: aPA-4 (18% of total thickness of layers 1–9);
Layer 36: TIE-1 (10% of total thickness of layers 1–9); and
Layer 26: 96% PA6-2+2% MB1+2% MB2 (13% of total thickness of layers 1–9).

Example 6

The films of Examples 1–5 were subjected to the following tests:
1) Storage Modulus: tested in both the machine direction (MD) and transverse direction (TD) in accordance with ASTM D-5026-95a; expressed in psi (pounds/in$^2$ of the cross-sectional area of the film) and reported as the average of the values measured for the MD and TD.
2) Tensile Strength and Elongation: tested in both the machine direction (MD) and transverse direction (TD) in accordance with ASTM D-882; tensile strength is expressed in psi (pounds/in$^2$) and elongation is expressed in %.
3) Young's Modulus: tested in both the machine direction (MD) and transverse direction (TD) in accordance with ASTM D-882; expressed in psi (pounds/in$^2$).
4) Haze: tested in accordance with ASTM D-1003; expressed in %.
5) Clarity: tested in accordance with ASTM D-1746; expressed in %.

The results are summarized in Table 1.

TABLE 1

| Test | Comp. Example 1 | Example 2 | Example 3 | Example 4 | Example 5 |
|---|---|---|---|---|---|
| Tensile Strength at yield measured at 73° F. MD/TD (psi × 1000) | 4.6/4.5 | 4.5/4.3 | 4.5/4.3 | 4.6/4.8 | 5.0/4.9 |
| Elongation at yield measured at 73° F. MD/TD (%) | 7.5/7.4 | 9.3/9.3 | 8.6/8.4 | 7.8/7.5 | 8.1/7.7 |
| Young's Modulus measured at 73° F. MD/TD (psi × 1000) | 127/132 | 100/110 | 122/116 | 128/137 | 145/147 |
| Storage Modulus at 150° C. (psi) | 11,684 | 47,235 | 45,640 | 64,458 | 61,964 |
| Haze (%) | 7.8 | 10.9 | 9.1 | 9.4 | 9.6 |
| Clarity (%) | 3.7 | 25.4 | 3.8 | 4.3 | 15.0 |

As indicated, the films of Examples 2–5 were similar to that of Comparative Example 1 in terms of optics and mechanical properties at lower temperatures. Significantly, however, the films of Examples 2–5 maintained high storage modulus, i.e., greater than 45,000 psi, at temperatures up to and exceeding 150° C. Such films therefore have excellent dimensional stability at high temperatures, such as those that are experienced during various packaging operations as discussed hereinabove. This is contrast to the film of Comparative Example 1, which exhibited a storage modulus of less than 12,000 psi at 150° C.

Example 7

In this example, the films of Examples 1–5 were sealed to a thermoformed pocket after placing a plastic block in the pocket as described below and evacuating the space between the film and pocket so that the block was vacuum-packaged inside of the resultant package. A Multivac R7000 vacuum packaging machine was used to make the packages. The films of Examples 1–5 were employed as top webs and joined via heat-sealing to a bottom web having thermoformed pockets therein. A block was placed in each pocket and sandwiched between the top and bottom webs in an evacuation/sealing chamber, a component of the R7000 packaging machine. In the chamber, air was evacuated such that a 10 mbar vacuum was produced. A heated seal-head then forced the top and bottom webs together for 1.0 second to produce a heat-seal between the two webs around the periphery of the pocket, thereby enclosing the block between the two webs. Various sealing temperatures ranging from about 85° C. to about 155° C. were used in order to test the ability of the films to both resist deformation and produce a heat-seal at such temperatures. Each resultant package was severed from the top and bottom webs to produce individual packages for inspection and testing as described below.

For the films of Comparative Example 1 and Examples 3–5, the bottom web to which such films were sealed had the following 9-layer structure:
Layer 1: 94% LLDPE-A+6% MB3 (8% of total thickness of layers 1–9) [ Heat Seal Layer];
Layer 2: 90% LLDPE-B+10% LLDPE-C (17% of total thickness of layers 1–9);
Layer 3: TIE-A (8% of total thickness of layers 1–9);
Layer 4: PA6-A (13% of total thickness of layers 1–9);
Layer 5: EVOH (10% of total thickness of layers 1–9);
Layer 6: PA6-A (13% of total thickness of layers 1–9);
Layer 7: TIE-B (7% of total thickness of layers 1–9);
Layer 8: PP-1 (14% of total thickness of layers 1–9); and
Layer 9: PP-2 (10% of total thickness of layers 1–9);

wherein,
LLDPE-A=a copolymer of ethylene and octene-1 having a density of 0.900 g/cc, a melt index of 6.0 g/10 min. and an octene percentage of 13%;
LLDPE-B=an ethylene/hexene-1 copolymer with a density of 0.918 g/cc and a melt index of 4.5 g/10 min.;
LLDPE-C=a linear low density polyethylene with a density of 0.915 g/cc;
Tie-A=an anhydride-grafted, butene-based LLDPE;
Tie-B=a maleic anhydride-grafted polypropylene;
PA6-A=a polycaprolactam (nylon-6) with a melting point of 220 degrees C;
EVOH=Same as other examples;
PP-1=an ethylene/propylene copolymer with a density of 0.902 g/cc and an ethylene content of 2.8 wt. %; and
PP-2=a propylene homopolymer a density of 0.900 g/cc.

"Layer 1" of the bottom web was sealed to "Layer 14" of the films of Examples 1 and 2–5 (both heat-seal layers are compatible in that both comprise a majority amount of LLDPE). With respect to the film of Example 2, the bottom web to which it was sealed was similar to the above-described bottom web, except that the heat-seal layer ("Layer 1") comprised a majority amount of an ionomer with a melting point of 96° C. to provide compatibility with the heat-seal layer of the film of Example 2 ("Layer 14"), which also comprised an ionomer.

In order to assess the ability of the films to resist deformation under stress and high temperatures, an "ink cracking" evaluation was performed on each film as follows. Prior to making the vacuum packages on the Multivac R7000 packaging machine as described above, the non-heat-seal surface of each film (i.e., the surface of "Layer 26") was first corona treated after extrusion (watt density of 2.0 kW and line speed of 200 ft/min.) and then again on a flexographic printing press (2.5 to 3.0 kW at a line speed of approximately 125 fpm). The film was printed with a large coverage of white (model #P001) and black (model # P019) solvent-based inks from AXL. Flexographic printing plates having eyebars at 896 mm over 3 repeats were used. The inks were dried at tunnel temperatures ranging from about 120–130° F. All printed areas, including eyebars, were overcoated with Sun GAIFBO440206 EB OPV from Sun Chemical. This electron-beam-curable over-print varnish was then electron-beam cured at a dose of 2 mR at 70 kV. The film was then slit to 405 mm in order to be tested on the Multivac R7000.

As noted above, each of the vacuum packages contained therein a plastic block. Each block (L=7.5", W=3.5", H=2.0") contained a total of 10 holes that were evenly spaced in two rows on the surface of the block. The diameter of the holes varied from 10 to 19 mm, and all had a depth of 40 mm deep (hole diameters in first row=10, 11, 12, 13 and 14 mm; hole diameters in second row= 15, 16, 17, 18 and 19 mm). A total of 4 packages were made with each of the films of Examples 1–5.

The performance of the films was evaluated for sealing temperatures (as applied on the vacuum packaging machine) ranging from 100° C. to 150° C. The blocks were removed from the completed packages and the areas of the non-forming web corresponding to the hole locations on the test blocks were then inspected for ink cracking. During the vacuum packaging and heat-sealing process, a pressure differential across the films was produced, resulting in a net downward force that tended to push the films into the holes on the blocks. The ability of the film to resist such deformation at the applied sealing temperature is a measure of the film's ability to resist other types of deformation at similar temperatures, e.g., as may be experienced by the film during various packaging operations as described hereinabove. If the ink/varnish overcoat was found to be cracked in the area that was next to a hole during vacuum packaging, this indicated that excessive deformation occurred. The results are summarized in Table 2, and are expressed as the percentage of hole locations on the film that exhibited signs of ink cracking for each seal temperature (averaged from the 4 packages made at each seal temperature for each of the films of Examples 1–5).

Also set forth in Table 2 are the storage modulus values measured for each film at each of the applied seal temperatures.

TABLE 2

| Example | $\Delta T$ ($T_g$ of aPA minus $T_m$ of Seal Layer (° C.)) | Sealing Temp. on Multivac R7000 (° C.) | Storage Modulus (psi) | % Holes with Ink Cracks |
|---|---|---|---|---|
| 1 (Comp.) [aPA-1 ($T_g$ = 125° C.); | 27 | 100 | 82,897 | Not Sealed |
| | | 115 | 74,077 | 48 |
| | | 130 | 39,896 | 78 |
| | | 150 | 11,684 | 95 |
| LLDPE-1 ($T_m$ = 98° C.)] | | | | |
| 2 [aPA-2 ($T_g$ = 155° C.); | 74 | 100 | 68,481 | 3 |
| | | 115 | 62,182 | 20 |
| | | 130 | 55,690 | 43 |
| | | 150 | 47,235 | 64 |
| LLDPE-3 ($T_m$ = 81° C.)] | | | | |
| 3 [aPA-2 ($T_g$ = 155° C.); | 87 | 100 | 62,712 | 0 |
| | | 115 | 56,728 | 18 |
| | | 130 | 53,903 | 44 |
| | | 150 | 45,640 | 71 |
| LLDPE-2 ($T_m$ = 68° C.)] | | | | |
| 4 [aPA-3 ($T_g$ = 158° C.); | 90 | 100 | 87,587 | 1 |
| | | 115 | 80,806 | 21 |
| | | 130 | 76,990 | 48 |
| | | 150 | 64,458 | 91 |
| LLDPE-2 ($T_m$ = 68° C.)] | | | | |
| 5 [aPA-2 ($T_g$ = 181° C.); | 113 | 100 | 76,946 | 0 |
| | | 115 | 71,073 | 1 |
| | | 130 | 66,855 | 15 |
| | | 140 | 64,361 | 31 |
| | | 150 | 61,964 | 49 |
| LLDPE-3 ($T_m$ = 68° C.)] | | | | |

As is apparent by the results shown in Table 2, the films of Examples 2–5, having a $\Delta T$ of at least 45° C., exhibit less ink cracking at each sealing temperature than the films of Comparative Example 1, with a $\Delta T$ of only 27° C. This provides a strong indication that the films of the invention exhibited less deformation at high temperatures than films having a $\Delta T$ of less than 45° C.

Also, the films of Examples 2–5 maintained a storage modulus of greater than 45,000 psi even as the seal temperatures were increased to 150° C. In contrast, the storage modulus of the film of Comparative Example 1 decreased sharply as the sealing temperature increased above 130° C. Consistent with this finding, the mechanical properties of the film of Example 1 have also been observed to drop steeply as the temperature of the film approached and exceeded about 130° C. Machineability issues such as poor print registration and excess web stretching were typically associated with this drop in mechanical properties. For example, the film of Comp. Example 1 was found to exhibit recurrent print registration issues when a seal temperature of 150° C. was employed. On the other hand, the films of Example 3 did not miss print registration at seal temperatures up to 165° C.

Example 8

In addition to greater dimensional stability at elevated temperatures as demonstrated in Example 7, films having a $\Delta T$ of at least 45° C. ($T_g$ of the amorphous polyamide minus $T_m$ of seal layer) in accordance with the present invention also provide the ability to seal at a lower temperature, relative to the $T_g$ of the amorphous layer, than films having a lower $\Delta T$. In this example, the seal strengths of Comparative Example 1 and Examples 3–5 were compared at various seal temperatures. For each test, the films of Examples 1 and 3–5 were sealed to the bottom web as described above (employing "LLDPE-A" as the heat seal layer). Seal strength was measured on an Instron's Model 5543 machine at a fast pulling rate as specified in ASTM D-882. All seals were produced on the Multivac R7000 machine using a 1 second dwell time and a pressure of approximately 3.2 bars. The seal strength values reported in Table 3 are an average of 4 readings at each seal temperature (2 readings in the machine direction, 2 readings in the transverse direction).

TABLE 3

| Example | Seal Temp (° C.) | | | | | | | | | |
|---|---|---|---|---|---|---|---|---|---|---|
| | 85 | 95 | 100 | 105 | 115 | 125 | 130 | 135 | 150 | 155 |
| Seal Strength of Comp. Ex. 1 (pounds/linear inch) | 0 | 0 | — | 2.7 | 15.7 | 16.0 | — | 14.6 | — | 15.6 |
| Seal Strength of Ex. 3 (pounds/linear inch) | 0 | 6.3 | — | 12.3 | 15.6 | 15.5 | — | 16.2 | — | 15.5 |
| Seal Strength of Ex. 4 (pounds/linear inch) | — | — | 6.0 | — | 14.5 | — | 14.4 | — | 15.1 | |
| Seal Strength of Ex. 5 (pounds/linear inch) | — | — | 8.8 | — | 14.5 | — | 14.4 | — | 14.4 | |

In general, a seal strength of at least 5 pounds/linear inch is required for commercial applications, and this was achieved for the films of Examples 3–5 at seal temperatures of 100° C. or less. In contrast, the film of Comparative Example 1 was unable to achieve a seal strength of at least 5 pounds/linear inch until a seal temp. of between 105 and 115° C. was reached. This is consistent with the data set forth above in Example 7, wherein the film of Comp. Ex. 1 could not form a seal sufficient to create a vacuum package at a seal temp. of 100° C. However, as also seen above in Example 7, at seal temps of 115° C. and above, the ink-crack performance of the films of Comp. Ex. 1 were inferior to the ink-crack performance of the films in accordance with the present invention. Accordingly, films having a ΔT of at least 45° C. provide greater resistance to thermal deformation at higher temperatures but also allow lower seal temperatures to be used, thereby providing a broader processing window than similar films with a ΔT of less than 45° C.

The seal strength performance of the films of Example 2 were similarly tested, except that the bottom web to which such films were sealed had a seal layer comprising an ionomeric material in order to be compatible with the ionomeric sealant in the seal layer of the film of Example 2. Ionomeric sealants exhibit different seal-strength characteristics than ethylene/alpha-olefin copolymer sealants as used in Examples 1 and 3–5. Thus, the seal-strength data is not directly comparable with that for Examples 1 and 3–5. For example, the film of Example 2 required a seal temp. of 135° C. to provide a seal-strength above 5 pounds/linear inch, which did not increase above 6 pounds/linear inch even at a seal temp. of 155° C. However, because such film had a ΔT of 74° C., the film still maintained good dimensional stability even at such elevated sealing temperatures (see Example 7).

While the invention has been described with reference to illustrative examples, those skilled in the art will understand that various modifications may be made to the invention as described without departing from the scope of the claims which follow.

What is claimed is:

1. A multilayer film, comprising:
   a. a first layer comprising an amorphous polymer that exhibits a glass transition temperature; and
   b. a second layer forming an exterior layer of said multilayer film and comprising a sealant material capable of forming a heat-seal, said sealant material comprising a polymer that exhibits a melting point, wherein, the glass transition temperature of said amorphous polymer is greater than the melting point of said sealant material by at least about 45° C.

2. The multilayer film of claim 1, wherein said amorphous polymer in said first layer has a glass transition temperature of at least about 140° C.

3. The multilayer film of claim 1, wherein said amorphous polymer in said first layer comprises an amorphous polyamide.

4. The multilayer film of claim 3, wherein said amorphous polyamide comprises at least one member selected from polyamide 6I/6T, polyamide 6I/MACMT, polyamide 6I/MACMI, polyamide 6I/MACMI/MACMT, polyamide 6I/MACMI/MXDI, polyamide 6I/6T/MACMI, polyamide 6I/6T/MACMI/MACMT, polyamide 12/MACMT, polyamide 12/MACMI, polyamide 12/IPDI/PACMI, polyamide 12/PACMI, polyamide TMDT, polyamide 6I/6T/IPD, polyamide 6I/6T/PACMI/PACMT, polyamide 6I/6, polyamide MACMI/MACMX, polyamide XT/MACMT, polyamide 6/AMNBT, polyamide PACM 12, and polyamide MDI6/MDI9.

5. The multilayer film of claim 3, wherein said first layer comprises a blend of at least two amorphous polyamides.

6. The multilayer film of claim 1, wherein said amorphous polymer in said first layer comprises at least one member selected from polycarbonate, cyclic olefin copolymer, polysulfone, polyethersulfone, polyarylsulfone, styrene maleic anhydride copolymer, polyetherimide, polyphenylene oxide, polyphenylene oxide/polystyrene alloys, polyphenylene ether and polyarylate.

7. The multilayer film of claim 1, wherein said sealant material in said second layer has a melting point of less than about 110° C.

8. The multilayer film of claim 1, wherein said sealant material in said second layer comprises at least one member selected from ionomers, heterogeneous ethylene/alpha-olefin copolymer, homogeneous ethylene/alpha-olefin copolymer, ethylene/unsaturated ester copolymer, ethylene/unsaturated acid copolymer, ethylene/propylene copolymer, and polybutylene homopolymer or copolymer.

9. The multilayer film of claim 1, further comprising a third layer adhered to a surface of said first layer.

10. The multilayer film of claim 9, wherein said third layer comprises at least one member selected from polyamide homopolymer or copolymer, acid-modified polyolefins, anhydride-modified polyolefins, ethylene/acrylic acid copolymer, ethylene/methacrylic acid copolymer, and ethylene copolymer or terpolymer having between 5 and 30 mole % ester mer units.

11. The multilayer film of claim 9, further comprising a fourth layer adhered to a surface of said third layer.

12. The multilayer film of claim 11, wherein said fourth layer comprises at least one member selected from ethylene/vinyl alcohol copolymer, polyamide MXD6, polyamide MXD6/MXDI, polyvinylidene chloride, and polyacrylonitrile.

13. The multilayer film of claim 11, wherein said film has an oxygen transmission rate of less than or equal to 30 cc of oxygen per square meter of film per 24 hour period at 1 atmosphere and at a temperature of 73° F. (at 0% relative humidity).

14. The multilayer film of claim 11, further comprising a fifth layer, said fifth layer forming an exterior layer of said multilayer film opposite said second layer and comprising a material having a surface energy of at least 36 dynes/cm$^2$.

15. The multilayer film of claim 14, wherein said fifth layer comprises at least one material selected from polyamides, polyesters, polycarbonates, polyurethanes, and polyacrylates.

16. The multilayer film of claim 14, further comprising a sixth layer adhered to a surface of said fourth layer, said sixth layer comprising at least one member selected from polyamide homopolymer or copolymer, acid-modified polyolefins, anhydride-modified polyolefins, ethylene/acrylic acid copolymer, ethylene/methacrylic acid copolymer, and ethylene copolymer or terpolymer having between 5 and 30 mole % ester mer units.

17. The multilayer film of claim 16, further comprising a seventh layer positioned between said second and sixth layers, said seventh layer comprising at least one material selected from high density polyethylene, low density polyethylene, linear low density polyethylene, cyclic olefin copolymer, polypropylene, polyamide, and polyesters.

18. The multilayer film of claim 1, wherein said film has a storage modulus of at least 100 pounds/linear inch of width at temperatures up to 140° C.

19. The multilayer film of claim 1, wherein said film has a thickness ranging from about 0.5 to about 50 mils.

20. The multilayer film of claim 1, wherein said film is coextruded.

21. The multilayer film of claim 1, further including at least one printed image on an outer surface thereof.

22. The multilayer film of claim 1, wherein said film has a storage modulus of at least 20,000 psi at 150° C.

23. A package made from the film of claim 1.

* * * * *